United States Patent [19]
Johnson et al.

[11] Patent Number: 5,808,611
[45] Date of Patent: Sep. 15, 1998

[54] POSITIONING FOR MULTIPLE ICONS IN AN OBJECT-ORIENTED INTERFACE

[75] Inventors: Karl David Johnson, Round Rock; Judith Holbrook Lewis; Steve Stanley Stone, both of Austin, all of Tex.

[73] Assignee: International Business Machines Corporation, Armonk, N.Y.

[21] Appl. No.: 125,976

[22] Filed: Sep. 23, 1993

[51] Int. Cl.$^6$ ............................................. G09G 5/14
[52] U.S. Cl. ................................ 345/349; 395/682
[58] Field of Search ........................... 345/113, 114, 345/115, 116, 118, 145, 146, 119, 150; 395/155, 156, 157, 158, 159, 160, 145, 161, 154, 682, 195

[56] References Cited

U.S. PATENT DOCUMENTS

| | | | |
|---|---|---|---|
| 4,939,507 | 7/1990 | Beard et al. | 345/156 |
| 5,060,135 | 10/1991 | Levine et al. | 395/155 |
| 5,065,347 | 11/1991 | Pajak et al. . | |
| 5,079,695 | 1/1992 | Dysart et al. . | |
| 5,115,504 | 5/1992 | Belove et al. . | |
| 5,133,070 | 7/1992 | Barker et al. . | |
| 5,230,072 | 7/1993 | Smith et al. . | |
| 5,237,654 | 8/1993 | Shackelford et al. . | |
| 5,295,243 | 3/1994 | Robertson et al. | 395/160 |
| 5,317,732 | 5/1994 | Gerlach, Jr. et al. | 395/154 |
| 5,341,466 | 8/1994 | Perlin et al. | 395/145 |
| 5,353,401 | 10/1994 | Iizawa et al. | 395/155 |
| 5,459,832 | 10/1995 | Wolf et al. | 395/155 |

FOREIGN PATENT DOCUMENTS 222900  3/1990  United Kingdom .

OTHER PUBLICATIONS

IBM Technical Disclosure Bulletin vol. 37 No. 04B Apr. 1994, Simulating the Workplace Shell Fanning of Container records. pp. 309–310.

*Primary Examiner*—Steven J. Saras
*Assistant Examiner*—Paul A. Bell
*Attorney, Agent, or Firm*—Jeffrey S. LaBaw

[57] ABSTRACT

A method, system and program for creating child graphical objects in an object oriented graphical user interface. First, the child object is created by copying a set of attributes from a parent graphical object to a memory partition allocated to the first child graphical object. This operation is typically called inheritance or subclassing in object oriented programming. Next, the location data of the first child graphical object is automatically changed from those copied from the parent graphical object. Next, the parent and child graphical objects are displayed on a display in the graphical user interface, the child graphical object being offset in location from the parent graphical object.

16 Claims, 12 Drawing Sheets

POSITIONING FOR MULTIPLE ICONS IN AN OBJECT-ORIENTED INTERFACE

DESCRIPTION

Background of the Invention

The invention relates generally to object-oriented programming. More particularly, it relates to the creation of a graphical user interface by means of object-oriented programming.

With the increasing complexity of computer programming in today's systems, object-oriented programming has received increased attention in an effort to reduce the work required to upgrade and maintain programming. Object-oriented programming offers software developers the ability to reuse and extend units of programming called "objects" which encapsulate both methods and data. Object-oriented programs are easier to maintain and enhance than traditional procedure based programming. Design changes in parent objects will transfer through to any child objects which inherit behavior or data from their parents during the runtime build of the object-oriented program.

Objects are generally categorized into "classes", which is a generic identification for an entity which exhibits certain behaviors. A class is a pattern which is used to create copies of the original object. Each copy of the class is called an "object" or an "instance" of a class. The object has behavior supplied by the method from its class object, and a state from the data values it gets when it is created together with the values computed by its methods. Inheritance, subclassing or class derivation is a technique for developing new classes from existing classes. The original class is called a "base class" or "parent class" and the derived class is called a "child class or subclass". The primary advantage of inheritance is that a derived class inherits all its parent's methods. Also, through inheritance, a new class can override or redefine methods of its parent class to provide new functions as required.

Object-oriented programming can be used for any purpose that traditional procedure based programming can be used, including the creation of a graphical user interface. Because of the amount of programming required to create graphical objects such as icons, a programmer wants to develop new objects which inherit as many of their attributes as possible from the parent object. One particular problem of iteratively creating multiple child graphical objects, is that each new object of a particular class will be positioned exactly in the same spot on the screen as they inherit the position data and attributes from their parent. Since each newly created icon appears on top of all previously created icons, only the most recently created icon will ever be visible in the graphical user interface.

The prior art solves this problem by requiring the user or application developer to manually specify the desired position of the newly created icon as part of the creation process. This can be done by the entry of position information in a data structure kept with the newly created icon or by a drag and drop operation with a pointing device where the user manually positions the new icon.

The present invention provides a new solution to this problem.

SUMMARY OF THE INVENTION

It is therefore an object of the invention to create child graphical objects from a class object and to automatically modify its inherited position.

It is another object of the invention to create a plurality of child graphical objects, all of which have a different location in the interface.

These objects and others are accomplished by a method, system and program for creating child graphical objects in an object oriented graphical user interface. First, the child object is created by copying a set of attributes from a parent graphical object to a memory, usually a partition allocated to the first child graphical object. This operation is typically called inheritance or subclassing in object oriented programming. Next, the location data of the first child graphical object is automatically changed from those copied from the parent graphical object. Thus, when the parent and child graphical objects are displayed on a display in the graphical user interface, the child graphical object is offset in location from the parent graphical object.

Additional child objects can be created by repeating the copying and changing steps for as many graphical objects as desired. However, since the additional child objects should not be presented on top of the first child graphical object, a test is performed to determine whether the location of the last created child graphical object is closer than a prescribed distance from the location of any other child graphical object. The location of the last child graphical object is changed until it is further than the prescribed distance from the other child graphical objects. Thus, the parent and child graphical objects are displayed in the graphical user interface, the child graphical objects being offset in location from the parent graphical object and each other. The offset between the parent and the first child object and the offset between the child objects may differ. Once the child graphical objects are created, their locations can be changed according to a drag and drop operation.

BRIEF DESCRIPTION OF THE DRAWINGS

These and other features, advantages and objects will be more easily understood with references to the following description and attached drawings.

DETAILED DESCRIPTION OF THE DRAWING

The invention may be run on a variety of computers or collection of computers under a number of different operating systems. The computer could be, for example, a personal computer, a mini computer or mainframe computer or a workstation in a network such as a Local Area Network or Wide Area Network or larger teleprocessing system. Although the specific choice of computer is limited only by disk and disk storage requirements, computers in the IBM PS/2 (TM) series of computers could be used in the present invention. For additional information on IBM's PS/2 series of computers, the reader is referred to *Technical Reference Manual Personal Systems/2 Model* 50, 60 *Systems IBM*

*Corporation*, Part No. 68X2224 Order Number S68X-2224 and *Technical Reference Manual Personal Systems/2 (Model 80) IBM Corporation* Part No. 68X 2256 Order Number S68X-2254. One operating system which an IBM PS/2 personal computer may run is IBM's OS/2 2.0 (TM). For more information on the IBM OS/2 2.0 Operating System, the reader is referred to *OS/2 2.0 Technical Library, Programming Guide Vol.* 1, 2, 3 *Version* 2.00 Order Nos. 10G6261, 10G6495, 10G6494.

Figure 1:
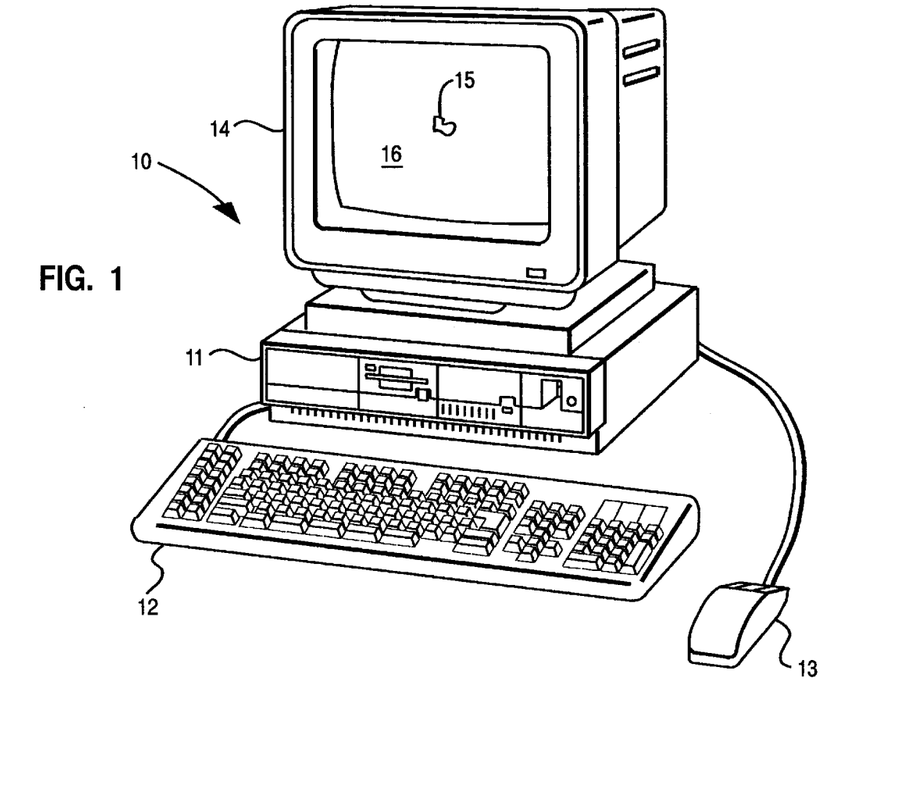
FIG. 1 depicts a computer system including system display, system unit, mouse and keyboard.

In FIG. 1, a computer 10, comprising a system unit 11, a keyboard 12, a mouse 13 and a display 14 are depicted. The screen 16 of display device 14 is used to present the visual changes to the data object. The graphical user interface supported by the operating system allows the user to use a point and shoot method of input by moving the pointer to an icon representing a data object at a particular location on the screen 16 and press one of the mouse buttons to perform a user command or selection.

Figure 2:
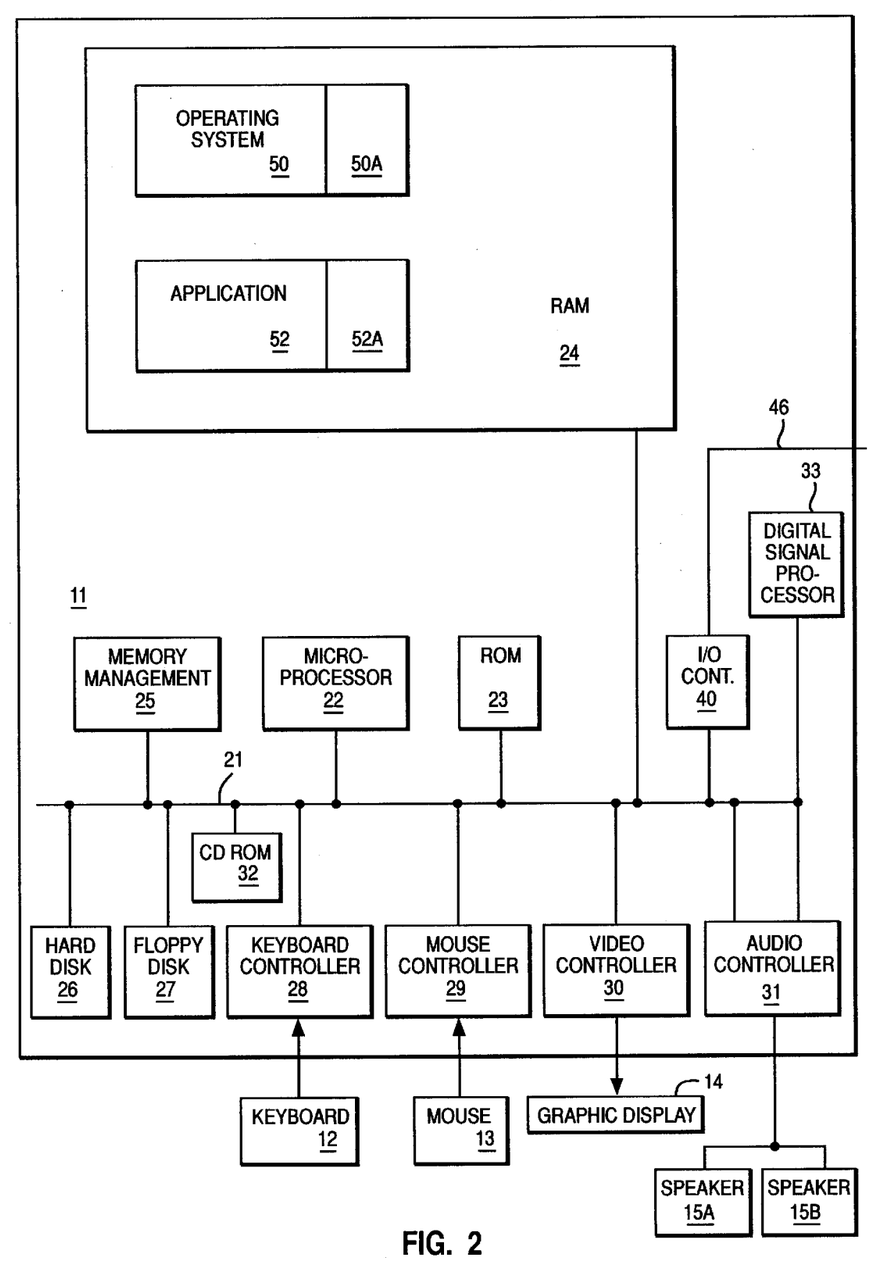
FIG. 2 is an architectural block diagram of the computer system in FIG. 1.

FIG. 2 shows a block diagram of the components of the personal computer shown in FIG. 1. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM multimedia PS/2 series of computers is one of the Intel family of microprocessors including the 386 or 486 microprocessors. However, other microprocessors including, but not limited to, Motorola's family of microprocessors such as the 68000, 68020 or the 68030 microprocessors and various Reduced Instruction Set Computer (RISC) microprocessors manufactured by IBM, Hewlett Packard, Sun, Intel, Motorola and others may be used in the specific computer.

The ROM 23 contains among other code the Basic Input-Output system (BIOS) which controls basic hardware operations such as the interaction and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. Also coupled to the system bus 21 is digital signal processor 33 which is incorporated into the audio controller 31. An I/O controller 40 such as a Token Ring Adapter enables communication over a network 46 to other similarly configured data processing systems.

Pictured within random access memory 24 is operating system 50 and application program 52. The operating system 50 controls the graphical user interface presented by the computer on the display and the access of other application programs to user input from the input devices. Some operating systems may operate in cooperation with a presentation manager to manage the graphical user interface. For example, Windows 3.1™, a presentation manager, operates over the Disk Operating System (DOS) for the IBM compatible computers. On the other hand, OS/2™ is a single software product, which includes both presentation manager and operating system functions. One skilled in the art would recognize that the block 50 represents the code which performs both sets of functions no matter how they may be configured.

In the graphical user interface, the objects, e.g., the operating system, operating system utilities, applications and data files are represented by icons on the system display. Once the user moves the cursor or pointer to an icon position and manipulates the keyboard or mouse or other pointing device, the object is opened. For example, to invoke the application 52, the user would move the mouse pointer to an icon in a GUI which represented the application and click on the left mouse button. For the purposes of this invention, an icon should be considered as a minimized window.

As depicted in the figure, one of the preferred embodiments of the present invention is a set of instructions in a code module resident in the random access memory 24. The code module could be incorporated in the operating system 50A or in the application program 52A, for example. Until required by the computer system the set of instructions could be stored in another memory, for example, the hard disk in the hard disk drive 26, or a removable memory such as an optical disk for the CD-ROM 32 or a floppy disk for the floppy disk drive 27.

The System Object Module (SOM) is a new object-oriented technology for packaging and manipulating objects from various object-oriented programming. SOM is described in great detail in the *OS/2 2.0 SOM Guide and Reference* and the *SOM Tool Kit Users Guide*, both (May 1993) publications of the IBM Corporation and hereby incorporated by reference. SOM is also the subject of copending and commonly assigned application, Ser. No. 07/805,668 entitled "Language Neutral Objects" filed May 4, 1992 to M. Conner et al, which is also hereby incorporated by reference. In the preferred embodiment, SOM is used to construct the graphical user interface.

Figure 2A:
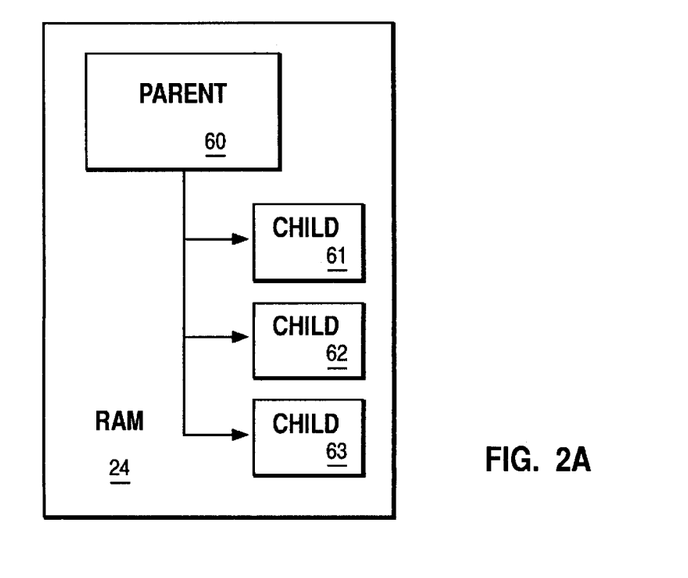
FIG. 2A represents the hierarchical relationship between a parent object and its child objects.

FIG. 2A illustrates the hierarchical relationship between a parent object and three child objects created from the parent. The parent object 60 can be presented on the system display as an icon window or other graphical object. Three child objects, 61, 62, 63, can be created from the parent object inheriting most of the data and methods from the parent unless overridden by the user or programmer. Storage space in the random access memory 24, is allocated to each of the objects as the program with which they are associated is executing in the computer. For example, as the child objects 61, 62, 63 are created, a memory partition is allocated for each. After the creation of the child objects and the user decides to execute other operations, the objects are stored in a permanent memory such as the hard disk drive.

There are many possible formats for the data structures which embody the object. It is likely that there are several layers of complexity involved in the data structures which comprise the "ObjectInfo" structure used in the method to set the position of the newly created icon. In one preferred embodiment, the following three structures are embedded to form the final "ObjectInfo" structure.

```
1) The "ObjectInfo" structure
    typedef struct __ObjectInfo {
        USHORT usObjClass;
        USHORT usObjType;
        PSZ    pszObjName;
        PSZ    pszPrimaryText;
        ObjectIconInfo IconInfo;
    } ObjectInfo, *pObjectInfo;
2) The "ObjectIconInfo" structure (embedded in "ObjectInfo",)
    typedef struct __ObjectIconInfo {
        ICONINFO IcoRegular;
        ICONINFO IcoOverlay;
        POINTS   points; /* SHORT x,y */
    }ObjectIconInfo;
3) The "POINTS" structure (embedded in "ObjectIconInfo",)
    typedef struct __POINTS /* pts */
    {
    SHORT x;
    SHORT y;
    }POINTS;
        typedef POINTS *PPOINTS;
The following is the condensed form of the above three structures
(conceptually how the "ObjectInfo" structure appears):
struct __ObjectInfo {
USHORT usObjClass;/* global value which identifies the class */
USHORT usObjType;/* global value which identifies the class
        behavior*/
PSZ pszObjName;/* attribute which can be changed by user */
PSZ pszPrimaryText;/* attribute which can be changed by user */
    ObjectIconInfo IconInfo;
        ----> ICONINFO IcoRegular ; /*platform specific info */
            ICONINFO IcoOverlay; /*about the icon, */
                /*ie, bitmap file name,*/
                /* resource, etc.  */
        POINTS   points;    /* SHORT x,y */
            ----> SHORT x;
                  SHORT y;
    }
        ----> ICONINFO IcoRegular ; /*platform specific info */
            ICONINFO IcoOverlay; /*about the icon, */
                /*ie, bitmap file name,*/
                /* resource, etc.  */
        POINTS   points;    /* SHORT x,y */
            ----> SHORT x;
                  SHORT y;
```

Figure 4:
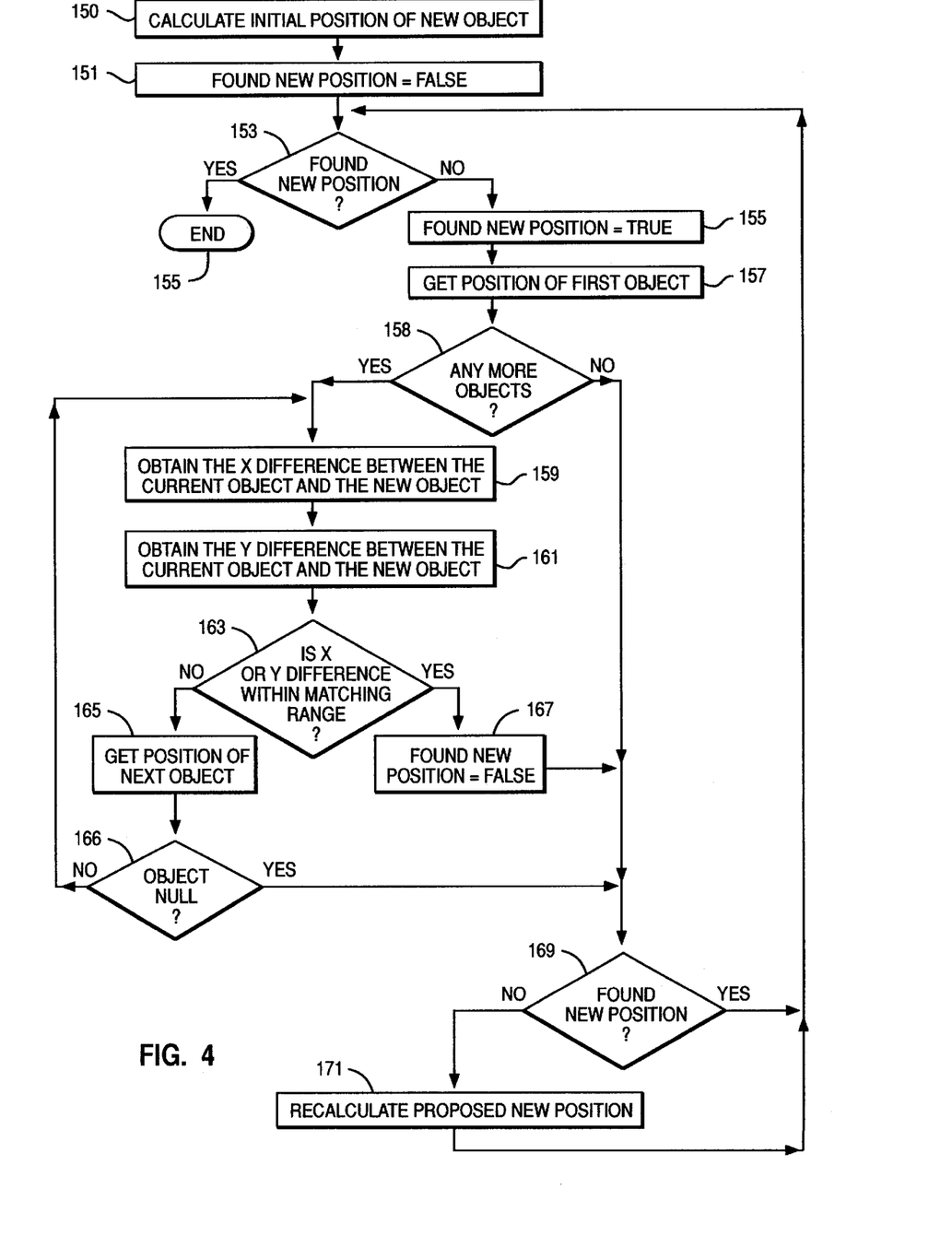
FIG. 4 is a flow chart for calculating the position of a new graphical object from an existing graphical object.

In the flow diagram of FIG. 4, the X and Y positions of the existing objects are found in the data structures at ObjectInfo.IconInfo.points.x and OBjectInfo.IconInfo.points.y respectively.

Figure 3:
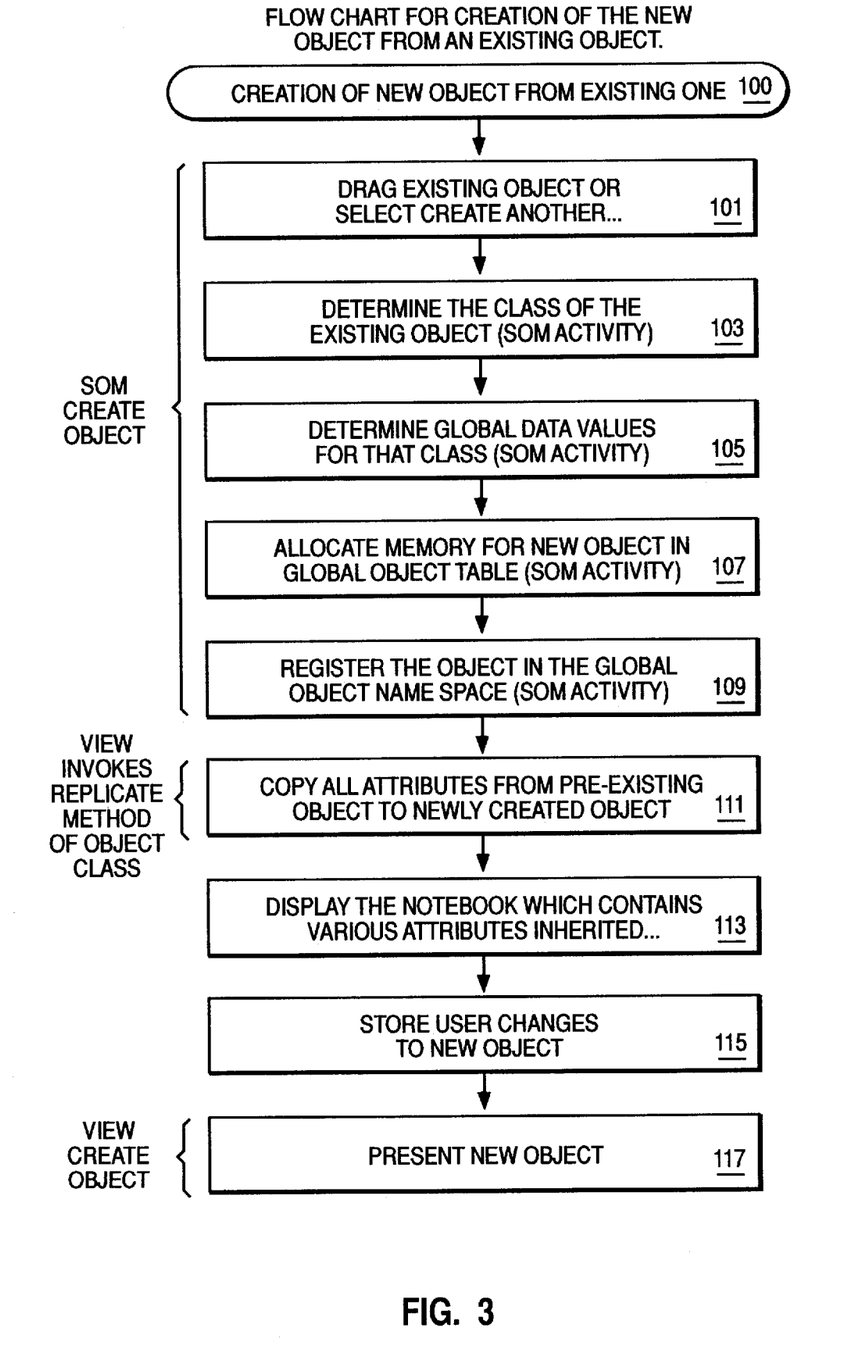
FIG. 3 is a flow chart for the creation of new object from an existing graphical object.

The process in one preferred embodiment for the creation of a new graphical object from an existing object is depicted in FIG. 3. The new icon is created, step 100, by inheriting most of the data and methods from an existing icon. The user will initiate this process, for example, by selecting an option to create another graphical object in a menu. In OS/2 2.0, this is accomplished by dragging a template object, control dragging an existing object or by making a selection from a menu. Alternatively, commands from a command line interface could be used. Next, in step 103, the class of the existing, parent object is determined. In step 105, any default data values for that class would be retrieved. In step 107, SOM allocates memory for the new graphical object in the random access memory. Next, in step 109, the object is registered in a data structure which keeps track of all objects in the graphical user interface.

Next, step 111, all the attributes (including methods) from the parent graphical object are copied to the newly created child graphical object. This can be accomplished by invoking a replicate method for that particular object's class. In the preferred embodiment, the interface of the system will then display a panel, such as a notebook object, which contains lists of various inherited attributes which may be modified by the user.

After the user inputs any requested changes in step 115, the user input is stored and changed in the newly created graphical object. Finally, in step 117, the newly created object is presented in the graphical interface. According to the invention, the new object is presented in an offset location from the existing object from which it was created.

The flow chart for calculating the position of a new object which inherits its attributes from the existing object is shown in FIG. 4. The process in FIG. 4 occurs before the new object is presented in step 117 of FIG. 3. In step 150, the initial position of the new object is calculated. This is done according to the calculation Proposed X Position of New Object=X Position of Existing Object+Fixed Amount 1, Proposed Y Position of New Object=Y Position of Existing Object+Fixed Amount 1. The fixed amount can vary according to the desires of the designer of the interface, however, ranges between a 16 to 50 pixel offset appeared most aesthetically pleasing to the Applicants.

Next, in step 151, the FoundNewPosition variable or flag is set to false. The system proceeds to the test step 153, to determine whether the FoundNewPosition flag is true. During the first pass, the FoundNewPosition flag will be set to false, so therefore, the method will proceed to step 155 where the FoundNewPosition flag will be set to true. In step 157, the position of the newly created child graphical object is retrieved. In step 158, a test is performed to determine whether there are any sibling objects of the newly created object, that is, whether any other child objects were created from the existing child object. If so, in steps 159–163, tests are performed on each sibling object to determine whether the most newly created object is at an identical or too proximate location with respect to any of its siblings. In step 159, the X difference between a current object in the sibling list and the new object is obtained. In step 161, the Y difference between the current sibling object and the new object is retrieved. Next, in step 163, a test is performed to determine whether the X and Y differences between the new child and current sibling objects are within a "matching range". The matching range represents a distance in which the sibling objects are too close within the graphical user interface in the opinion of the designer. The objects may be too close because they are difficult to visually discern from each other or because they are difficult to manipulate a mouse pointer for a subsequent drag and drop operation. The Applicants have found that a matching range of 10±5 pixels is aesthetically and ergonomically acceptable, since overlapping icons were not deemed to be a problem. An application in which the developer wishes to avoid overlapping icons would need a matching range greater than the size of the icons.

If the X or Y difference between the current object and the new object is not within the matching range, the two objects' locations are acceptable and in step 165, the position of the next sibling object is retrieved. If the object is set to null, step 166, that is there are no more objects, the process flows to step 169. If there is another object, the process returns to step 159. If the result in step 163 was that the newly created object was too close to the sibling object, in step 167, the FoundNewPosition variable is set to false. In step 169, a test is performed to determine whether the FoundNewPosition flag has been set to false. If the flag has been set to false, the position of the newly created graphical object is not acceptable with respect to the locations of the other sibling objects already created. In step 171, the new position of the new object is recalculated according to the equations: Proposed X Position of New Object=Proposed X Position of New Object+Fixed Amount 2, Proposed Y Position of New Object=Proposed Y Position of New Object+Fixed Amount 2.

If the newly created object's location is acceptable, when the process returns to step 153 and the FoundNewPosition flag is tested, it is set to true. The process ends at step 155. If it has been necessary to recalculate the newly created object's location, the FoundNewPostion flag is set to false. The test in step 153 returns the new position calculated in step 171 through the rest of the process to determine whether it is acceptable with the previously calculated positions for the sibling objects.

Pseudo code for calculating the position of the new object from an existing Object follows:

```
ProposedXPositionOfNewObject = XPositionOfExistingObject +
FixedAmount1
ProposedYPositionOfNewObject = YPositionOfExistingObject +
FixedAmount1
    Placed = FALSE
    While NOT Placed
| Placed = TRUE
| Get Position of first object
| If there are no other objects
|    BREAK
| DO
|| Obtain the x difference between the objects x position and
       the
|| proposed x position of the object being created
||
|| Obtain the y difference between the objects y position and
       the
|| proposed y position of the object being created
||
|| If the x or y difference is within a range considered
       matching
||    Placed = FALSE
||    BREAK
||
|| Get the position of the next object
|WHILE another object exists
|
|If NOT Placed
|    ProposedXPositionOfNewObject = ProposedXPositionOfNewObject
     +
|            FixedAmount2
|    ProposedYPositionOfNewObject = ProposedYPositionOfNewObject
     +
|            FixedAmount2
END While NOT Placed
```

Figure 5A:
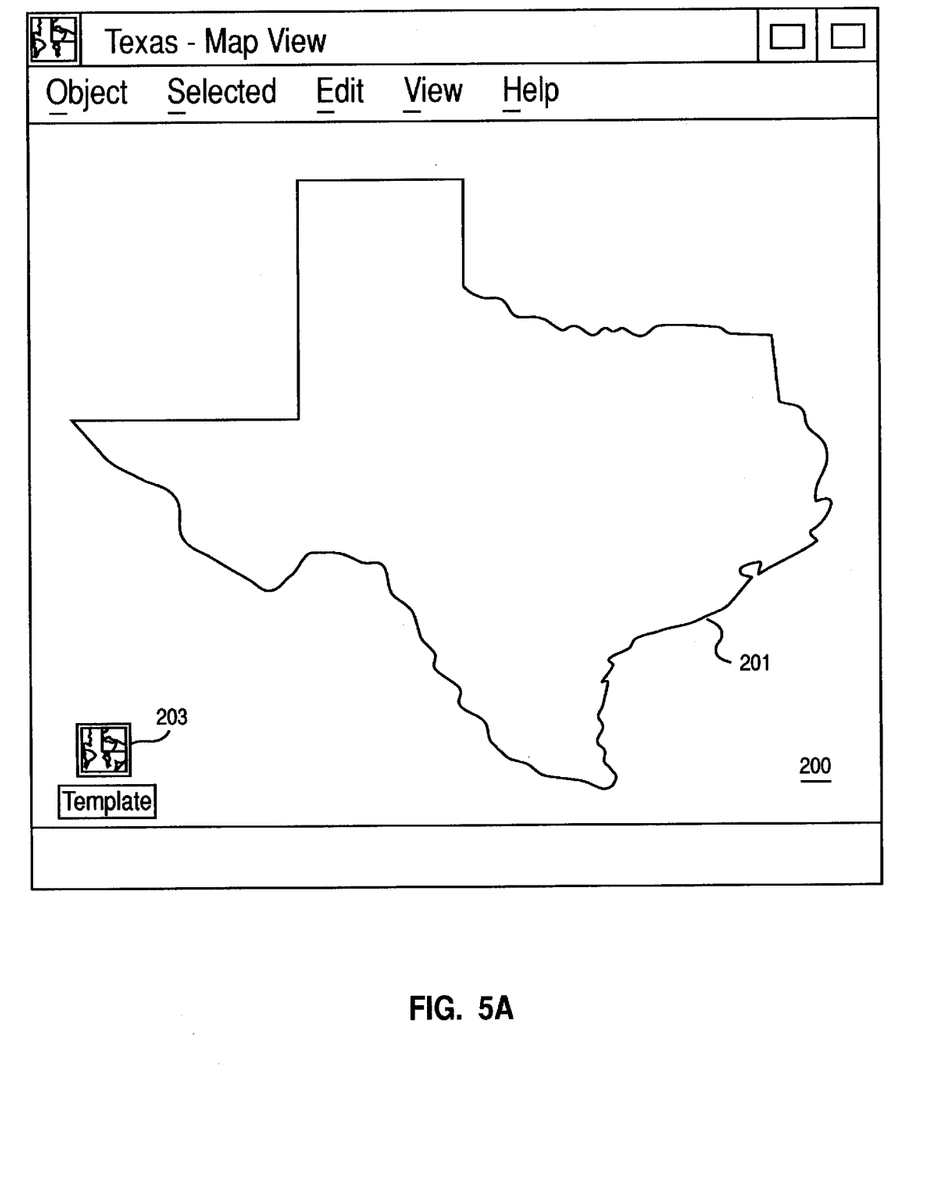
FIGS. 5A–5H depict a graphical user interface in which the plurality of icons are created from a parent icon.
Figure 5B:
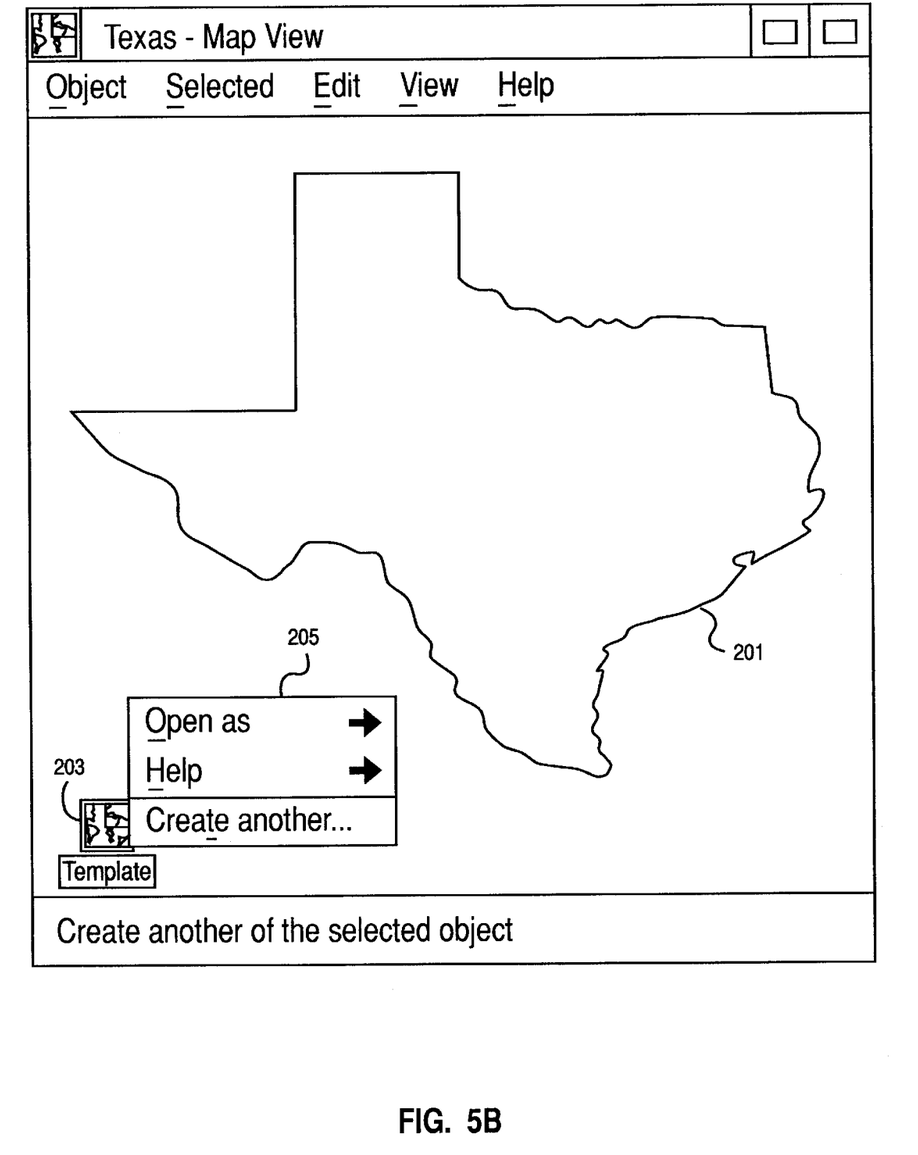
Figure 5C:
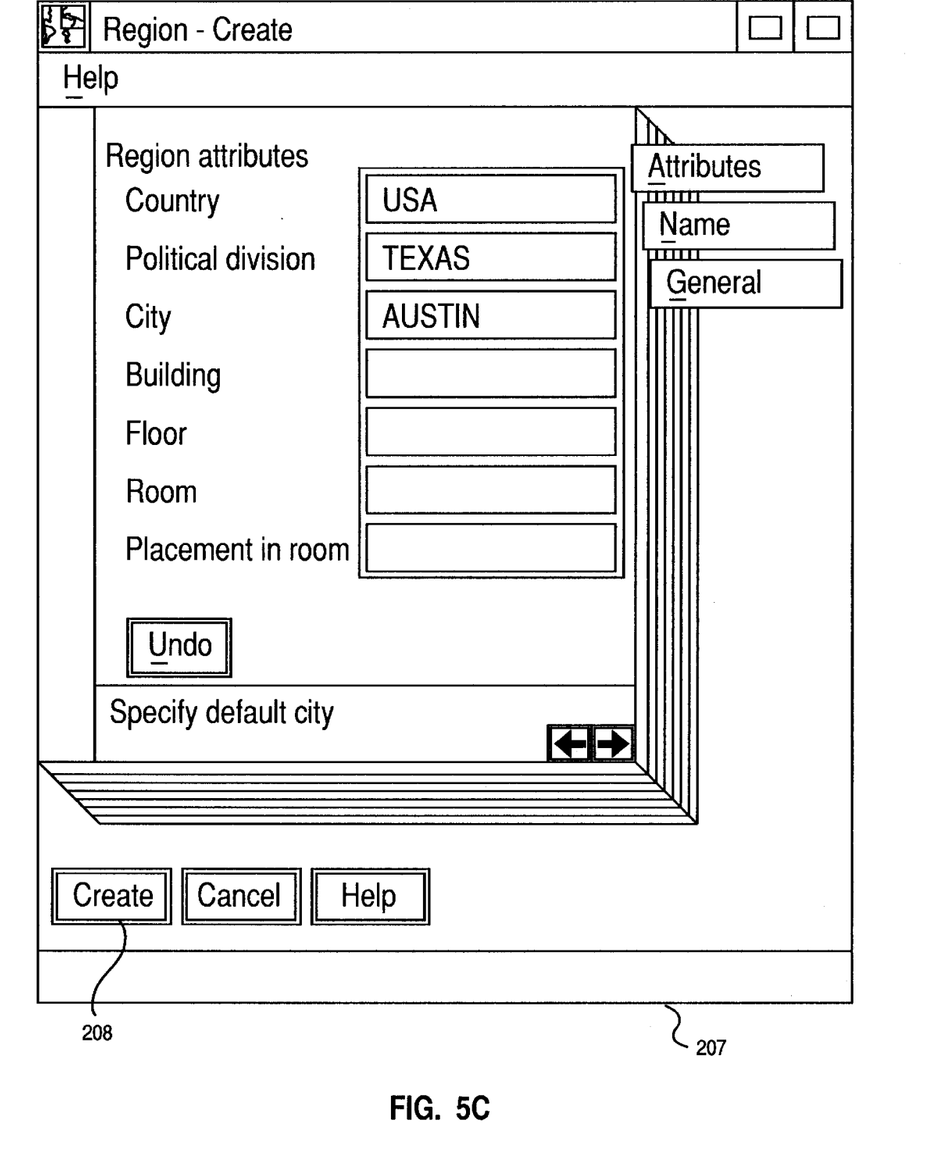

FIGS. 5A–5H depict a graphical user interface in which the present invention may be practiced. In FIG. 5A, a window 200 includes a map icon 201 of the state of Texas and a template icon 203 from which a plurality of city icons may be created. In FIG. 5B, the user has selected to create a child object of the template object of 203 which causes a popup window 205 to be presented. In OS/2, this is activated by pressing mouse button 2. The user selects the create another option in the menu and as shown in FIG. 5C, a panel, i.e., a notebook is presented to the user in which certain attributes of the child object may be modified. In the notebook 207, the user has elected to change some region attributes, selecting USA for the country, the political division as Texas and the city as Austin. After the create pushbutton 208 is selected, a new child icon is created.

Figure 5D:
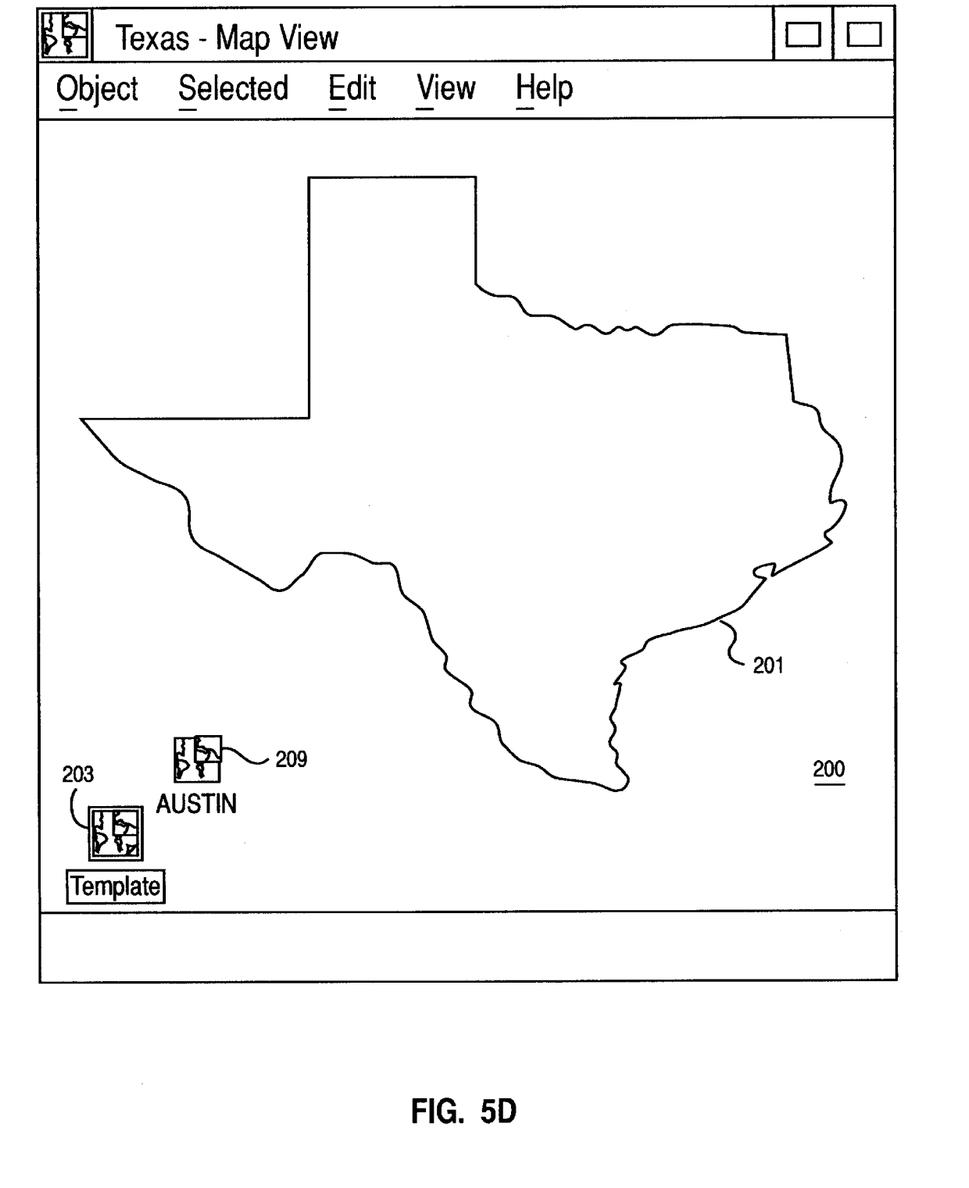
Figure 5E:
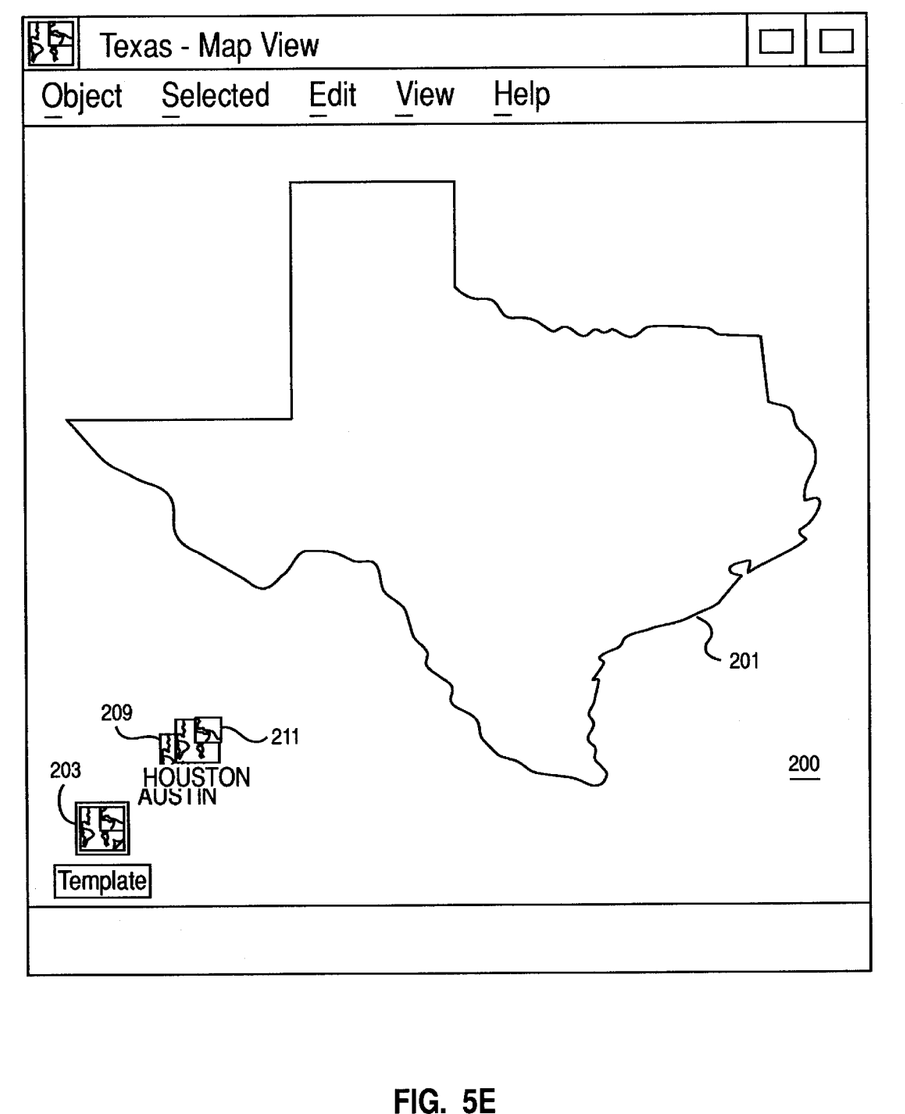
Figure 5F:
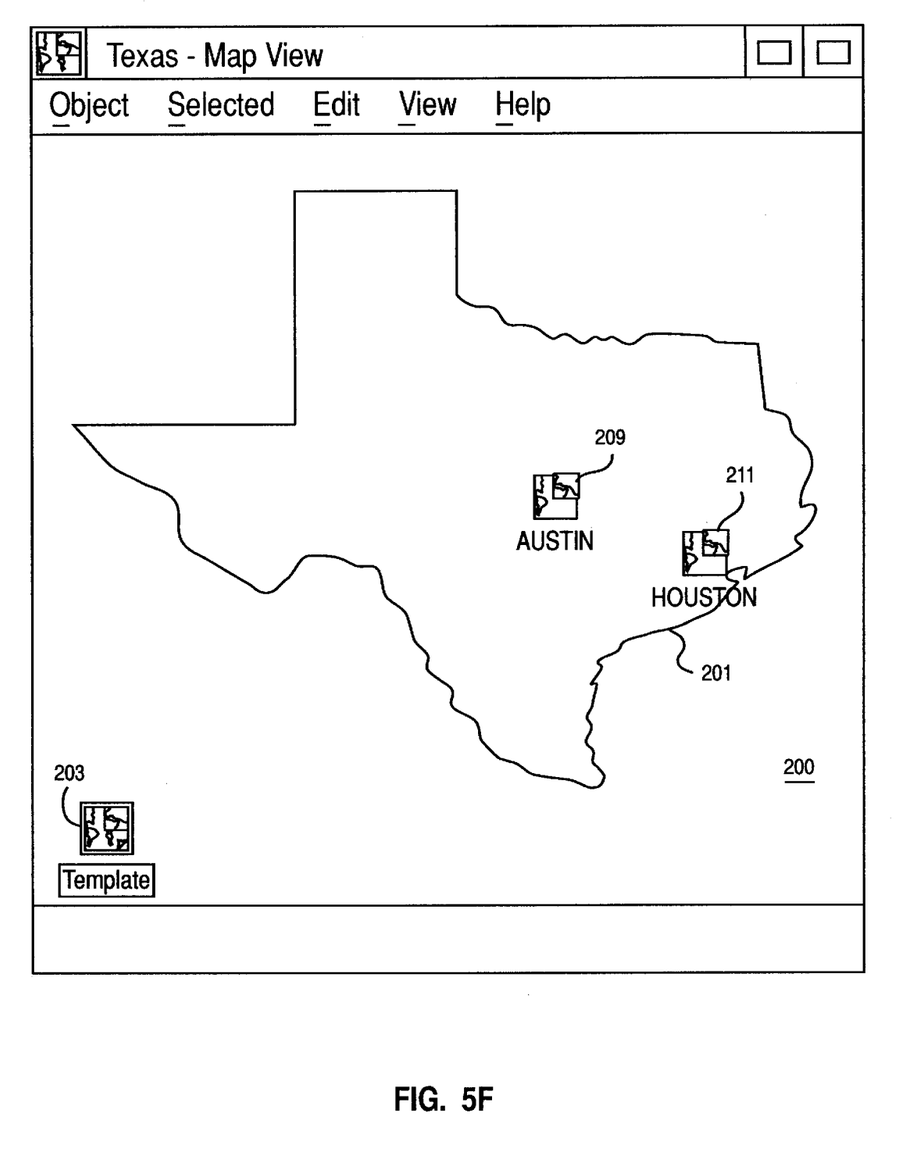

As shown in FIG. 5D, the Austin icon 209, the child object, is offset by a fixed amount from a template object 203, the parent object. The process may be repeated for a second sibling object: a Houston icon 211 is created. A notebook panel similar to that in FIG. 5C would be displayed. As shown in FIG. 5E, the Houston icon is offset an amount from the Austin icon 209. Note that the newly created icons are offset by a different amount from the parent object 203 from which they are created. The Applicants believe that it is useful to show that the sibling objects are related by off-setting them by a smaller difference than that which separates the parent object from the initially created child object. This process could be continued to created a cascade of sibling objects, each successively offset from a preceding sibling.

Figure 5G:
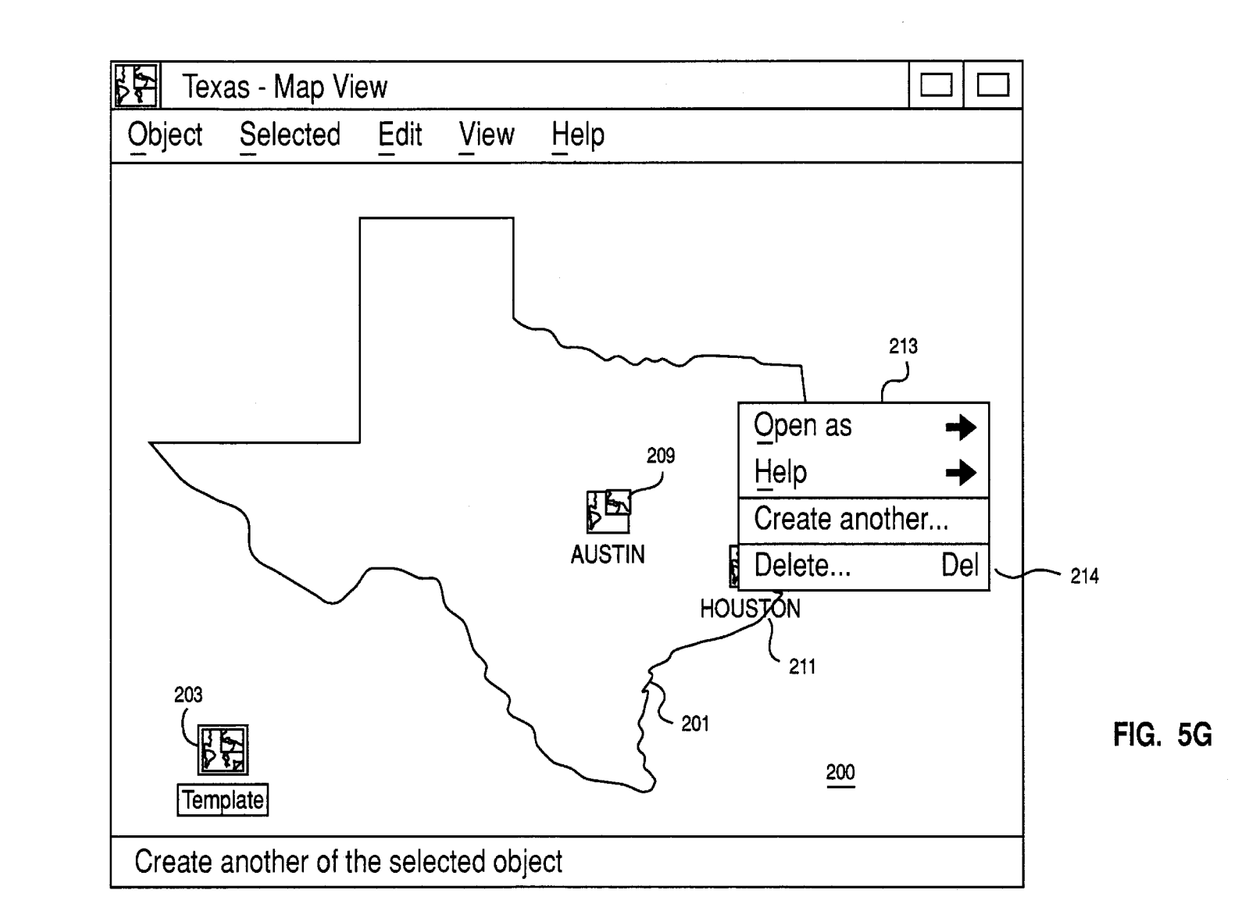
Figure 5H:
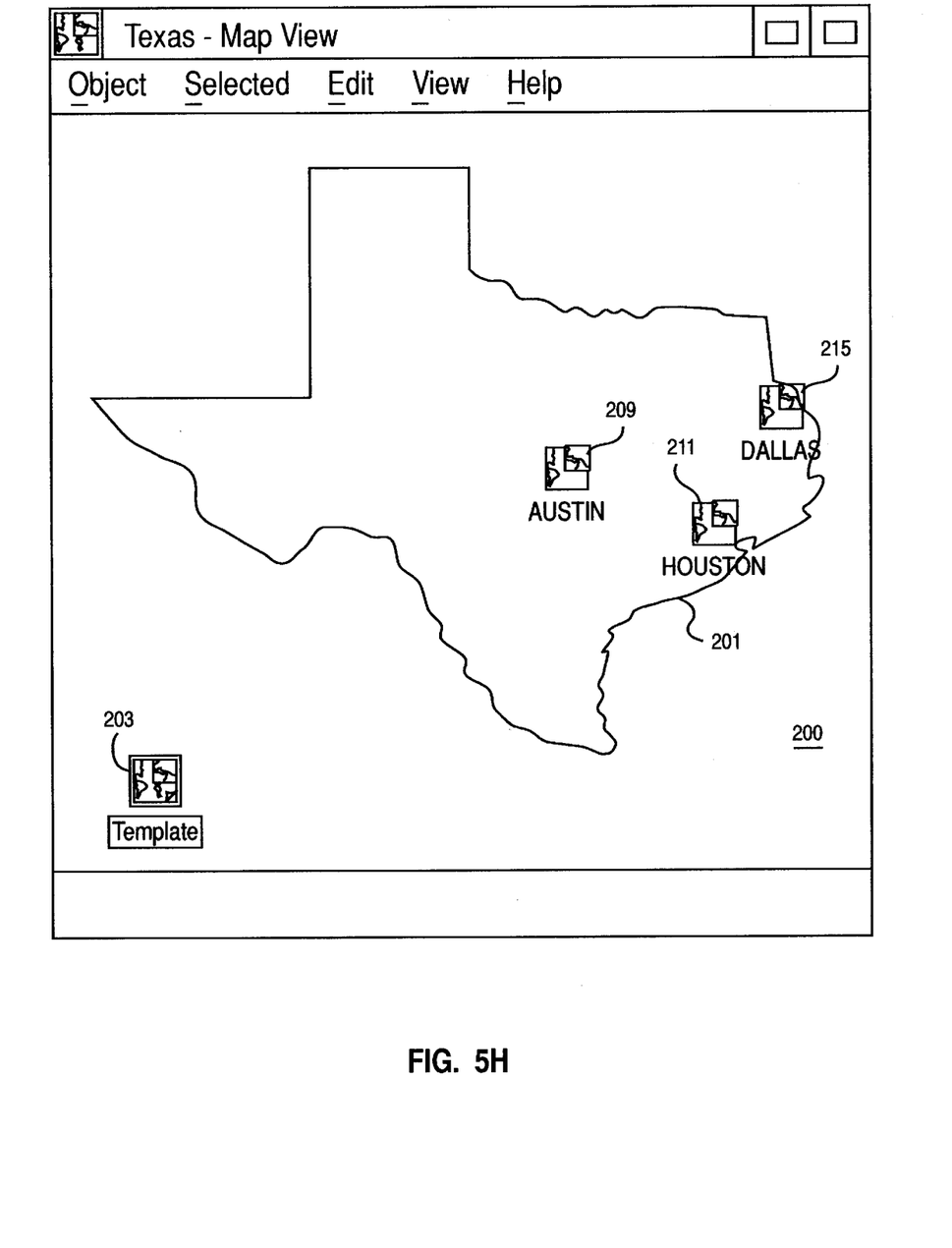

Once the child objects are created, the user might stop and drag the Austin icon 209 and the Houston icon 211 to the final positions desired in the graphical user interface. Note that in this case, the repositioning of the icon is a user action as opposed to a system action which occurred in the icon creation process. If the process of the present invention were not utilized, the Houston icon 211 only would be visible to the user, covering the Austin icon 209 and the template object 203. As shown in FIG. 5G, the creation of icons can continue, this time by selecting the Houston icon 211 as the parent icon from which a new icon will be created. This selection of the Houston icon 211 causes the popup menu 213 to be displayed. As the Houston icon 211 is recognized as a created icon by the system, a delete option 214 is added to the menu. After the create option is chosen by the user, a notebook panel similar to that in FIG. 5C is displayed wherein the city attribute is chosen to be Dallas. The creation pushbutton is selected whereupon a Dallas icon 215 is created as depicted in FIG. 5H.

While the invention has been described with respect to particular embodiments above, it will be understood by those skilled in the art that modifications may be made without departing from the spirit and scope of the present invention. The data structures (objects) which encapsulate the graphical elements such as icons in an interface are also written in procedural based languages. This invention can also be implemented in programming language such as C and a graphical object should be interpreted to embrace such an embodiment. These embodiments are for purposes of example and illustration only and are not to be taken to limit the scope of the invention narrower than the scope of the appended claims.

We claim:

1. A method for creating a first child graphical object responsive to user interaction in an object oriented graphical user interface comprising the steps of:

displaying a parent graphical object in the graphical user interface on a display;

responsive to a user input to the graphical user interface to add the first child graphical object to the graphical user interface, copying data from a parent graphical object to the first child graphical object in a memory;

changing location data of the first child graphical object from location data copied from the parent graphical object without user input indicative of a changed location; and displaying the parent and child graphical objects on the display in the graphical user interface, the child graphical object being offset in location from the parent graphical object.

2. The method as recited in claim 1 which further comprises the steps of:

responsive to a user input to the graphical user interface to add a second child graphical object to the graphical user interface, repeating the copying and changing steps for the second child graphical object;

determining whether location data of the second child graphical object are closer than a prescribed distance from location data of the first child graphical object;

changing the location data of the second child graphical object until further than the prescribed distance from those of the first child graphical object; and displaying the parent and child graphical objects on the display in the graphical user interface, the child graphical objects being offset in location from the parent graphical object and each other.

3. The method as recited in claim 2 wherein the first child graphical object location data are changed by a first offset from those of the parent graphical object.

4. The method as recited in claim 3 wherein the second child graphical object location data are changed by a second offset smaller than the first offset in the second changing step.

5. The method as recited in claim 1 further comprising the step of further changing the first child graphical object location data according to a drag and drop operation.

6. A system of creating a first child graphical object responsive to user interaction in an object oriented graphical user interface comprising:

means for displaying a parent graphical object in the graphical user interface on a display;

means responsive to a user input to the graphical user interface to add the first graphical object to the graphical user interface for copying data from a parent graphical object to a memory partition allocated to the first child graphical object in a memory;

means for changing location data of the first child graphical object from those copied from the parent graphical object without user input indicative of a changed location; and means for displaying the parent and child graphical objects on the display in the graphical user interface, the child graphical object being offset in location from the parent graphical object.

7. The system as recited in claim 6 which further comprises:

means responsive to a user input to the graphical user interface to add a second child graphical object to the graphical user interface for repeating the copying and changing steps for the second child graphical object;

means for determining whether location data of the second child graphical object are closer than a prescribed distance from location data of the first child graphical object;

means for changing location data of the second child graphical object until further than the prescribed distance from location data of the first child graphical object; and means for displaying the parent and child graphical objects on the display in the graphical user interface, the child graphical objects being offset in location from the parent graphical object and each other.

8. The system as recited in claim 7 wherein the first child graphical object location data are changed by a first offset from those of the parent graphical object.

9. The system as recited in claim 8 wherein the second child graphical object location data are changed by a second offset smaller than the first offset in the second changing step.

10. The system as recited in claim 6 further comprising means for further changing the first child graphical object location data according to a drag and drop operation.

11. The system as recited in claim 6 further comprising:

a memory coupled to a system bus for storing the graphical objects and sets of instructions for displaying the graphical user interface;

a processor coupled to the system bus for executing the sets of instructions stored in the memory;

a display coupled to the system bus for displaying the graphical user interface; and an input device for inputting user commands to the system.

12. A computer program product in a computer readable memory for creating a first child graphical object responsive to user interaction in an object oriented graphical user interface comprising:

means for displaying a parent graphical object in the graphical user interface on a display;

means responsive to a user input to the graphical user interface to add the first graphical object to the graphical user interface for copying data from the parent graphical object to the first child graphical object in a memory;

means for changing location data of the first child graphical object from those copied from the parent graphical object without user input indicative of a changed location; and means for displaying the parent and child graphical objects on the display in the graphical user interface, the child graphical object being offset in location from the parent graphical object without user input of the changed location data.

13. The product as recited in claim 12 which further comprises:

means responsive to a user input to the graphical user interface to add a second child graphical object to the graphical user interface, for repeating the copying and changing steps for the second child graphical object;

means for determining whether the location data of the second child graphical object are closer than a prescribed distance from location data of the first child graphical object;

means for changing the location data of the second child graphical object until further than the prescribed distance from location data of the first child graphical object; and means for displaying the parent and child graphical objects on the display in the graphical user interface, the child graphical objects being offset in location from the parent graphical object and each other.

14. The product as recited in claim 13 wherein the first child graphical object location data are changed by a first offset from those of the parent graphical object.

15. The product as recited in claim 14 wherein the second child graphical object location data are changed by a second offset smaller than the first in the second changing step.

16. The product as recited in claim 12 further comprising means for further changing the first child graphical object location data according to a drag and drop operation.

* * * * *

UNITED STATES PATENT AND TRADEMARK OFFICE
CERTIFICATE OF CORRECTION

PATENT NO. : 5,808,611
DATED : Sept. 15, 1998
INVENTOR(S) : Johnson et al

It is certified that error appears in the above-indentified patent and that said Letters Patent is hereby corrected as shown below:

Column 5, line 42, please delete "OBjectInfo." and insert --ObjectInfo.--.

Signed and Sealed this

Second Day of November, 1999

Attest:

Q. TODD DICKINSON

*Attesting Officer*   Acting Commissioner of Patents and Trademarks